United States Patent [19]

Glass

[11] 4,340,810
[45] Jul. 20, 1982

[54] METHOD AND APPARATUS FOR MERCHANDISE DISTRIBUTION CONTROL

[76] Inventor: Marvin Glass, 162-21 Powell Cove Blvd., Beechhurst, N.Y. 11357

[21] Appl. No.: 128,055

[22] Filed: Mar. 7, 1980

[51] Int. Cl.³ .............................................. G06K 5/00
[52] U.S. Cl. .................................... 235/375; 235/385
[58] Field of Search ............... 235/375, 383, 384, 385; 428/40; 283/55

[56] References Cited

U.S. PATENT DOCUMENTS

| | | | |
|---|---|---|---|
| 384,237 | 6/1888 | De Witt | 283/55 X |
| 1,196,749 | 8/1916 | Murphy | 283/55 X |
| 1,203,902 | 1/1914 | Nichols | 283/55 X |
| 1,280,182 | 10/1918 | Delson | 283/55 X |
| 1,568,595 | 1/1926 | Freeman | 283/55 X |
| 1,597,533 | 8/1926 | Meyers | 283/55 X |
| 3,484,976 | 12/1969 | Shea | 40/310 |
| 3,806,166 | 4/1974 | Spear | 283/55 |
| 3,993,814 | 11/1976 | Cavender | 428/40 |

*Primary Examiner*—Harold I. Pitts
*Attorney, Agent, or Firm*—Nolte and Nolte

[57] ABSTRACT

A merchandise distribution control system employs specialized labels and requires no writing by loading or shipping dock personnel. All labels and tabs are preprinted or printed at the same time and bear the appropriate store identification number and carton serial number. This printing can be in OCRA, UPC, magnetic, or dot code for manual or automatic scanning. A distribution list is printed by electronic data processing equipment and sets forth all of the merchandise to be distributed, thereby retaining the merchandise information in the system at the end of the distribution process. The distribution list has a plurality of detachable distribution labels, which are associated with the items of merchandise, and when merchandise is placed in the carbon the distribution labels are affixed to a carton manifest. A multi-part carton label is provided having detachable portions which may be affixed to the carton manifest and to a truck manifest and whereby the carton label may be affixed to the truck manifest at the time of loading, whereby accurate control of the location of all of the merchandise items is provided.

17 Claims, 5 Drawing Figures

METHOD AND APPARATUS FOR MERCHANDISE DISTRIBUTION CONTROL

BACKGROUND OF THE INVENTION

The present invention relates generally to distribution control systems and, particularly, to a system for controlling the distribution of consumer goods by means of a specialized labeling and manifesting system.

In the retail merchandising industry there often arises the situation where several stores receive their merchandise from a central location. The items of merchandise, such as garments, are first received in bulk from the manufacturer or warehouse at a central distribution location. This shipment must then be broken down into several discrete units for ultimate distribution to the several retail locations. A common way of doing this is to receive the items at a distribution center and then distribute the items among several cartons making notations on sheets of paper regarding the contents of each carton. Once a carton is full, it is placed on a truck and transported to the appropriate retail outlet.

There have been countless systems devised to keep track of the subsequent whereabouts of the items after receipt at the distribution center. Typically, all of these schemes involve personnel at the distribution center making lists or written notations on preprinted multi-part forms, which are then collated and reviewed in an attempt to control the distribution of the merchandise.

A more recently developed system for controlling merchandise distribution involves the use of pre-punched electronic data processing cards which are either received with the merchandise originally or subsequently generated and associated with the merchandise. Then, as the items of merchandise are cartonized or broken down into the separate cartons, the appropriate computer cards are placed in specific envelopes or plastic containers indicating the location of the goods. At the end of the day, or upon the goods reaching the appropriate destination, the cards are then run through a sorter and a printer and a printed record is produced identifying the goods and indicating the location thereof of the goods.

In any event, in most conventional systems there comes a time in the day when all manifesting operations and carton filling operations must stop, so that the information can be collected and sorted and the actual manifesting operation can be performed. Also, once the manifesting operation has been accomplished, it is necessary to enter such information into a record keeping system. Typically, the daily information is typed into an electronic data processing terminal, so that a print out of the actual location of the goods may be ultimately obtained. In addition, this information becomes the basis for financial record keeping and inventory control, including fashion reporting.

All of these prior systems require a substantial amount of writing by receiving, shipping, or loading dock personnel; a situation which can introduce numerous errors into the manifest data. Additionally, the efficiency of the entire distribution operation is greatly reduced, not only by all the writing that is required, but also by the requirement to stop the loading operation and collect data.

SUMMARY OF THE INVENTION

The present invention provides a merchandise distribution control system which requires little or no writing or hand entering of data by receiving, shipping or loading dock personnel. The inventive system is a real-time manifesting system which does not require a cut-off time or stoppage of the distribution operation, in order to accomplish the manifesting function. The present invention provides a system which can randomly manifest a carton as to the merchandise in it, without the necessity to write on separate sheets of paper or on the carton exterior.

The present invention provides a merchandise receiving control card which is a multipartite label, preprinted with a numbering system which carries through the entire manifesting operation. The merchandise receiving control card comprises a number of removable adhesive-backed labels, each bearing the same specific serial number. These labels are ultimately placed on the freight bill, the receiving log, the purchase order, and etc. Additionally, a distribution list, which may be printed by electronic data processing equipment, lists all of the pertinent information regarding the merchandise and provides a number of preprinted removable adhesive-backed labels for ultimate placement on the carton manifest sheet, also provided by the present invention.

In practicing the present inventive system the merchandise received at the distribution center is first associated with the serialized merchandise receiving control card which has the several removable adhesive labels each bearing the same serial number. A distribution sheet is generated, which lists all of the merchandise and its ultimate destination, and has a removable label indicating the same serial number and other information concerning the goods to go to each location or customer. These distribution labels are placed either on the actual merchandise, in an envelope, or on a plastic label carrier which is then attached to the merchandise. A serialized carton label is provided in the system which bears the individual store identification number and also the ongoing carton serial number on removable, adhesive-backed labels. An address label is removed from the carton label and placed on the carton containing the merchandise. The address label also has with it a separable truck manifest stub bearing both the carton number and the store number. The carton label also has a carton manifest header label, for placing at the top of the carton manifest, which also bears the carton serial number and store identification number. When the cartons are loaded onto a truck, the truck manifest stub of the address label, bearing the store number and the carton number is removed from the address label and placed on the truck manifest. In this way, an indication is readily available of not only the contents of the truck, but also of the stores to which the various cartons are to be directed. At the conclusion of the distribution activities, the original electronic data processing equipment which was utilized to print the distribution sheet in the first instance is seen to still contain a listing of all of the relevant items being distributed and, thus, it is not necessary to re-enter a listing of all of the merchandise back into the data processing system for financial record keeping, inventory control, or fashion reporting.

Therefore, it is an object of the present invention to provide a merchandise distribution control system which can randomly manifest a carton regarding the merchandise in it on a single sheet of paper without requiring writing on separate lists or on the carton.

It is another object of the present invention to provide a real-time manifesting system.

It is another object of the present invention to provide a merchandise distribution control system wherein at the conclusion of the carton loading stage, it is not necessary to re-enter information into an electronic data processing system.

It is still another object of the present invention to provide a system utilizing automated scanning equipment of the printed information in OCR, UPC, magnetic or dot code to eliminate the requirement for a truck manifest stub.

The manner in which these and other objects are accomplished by the present invention will become apparent from the following detailed description.

DETAILED DESCRIPTION OF THE INVENTION

Figure 1:
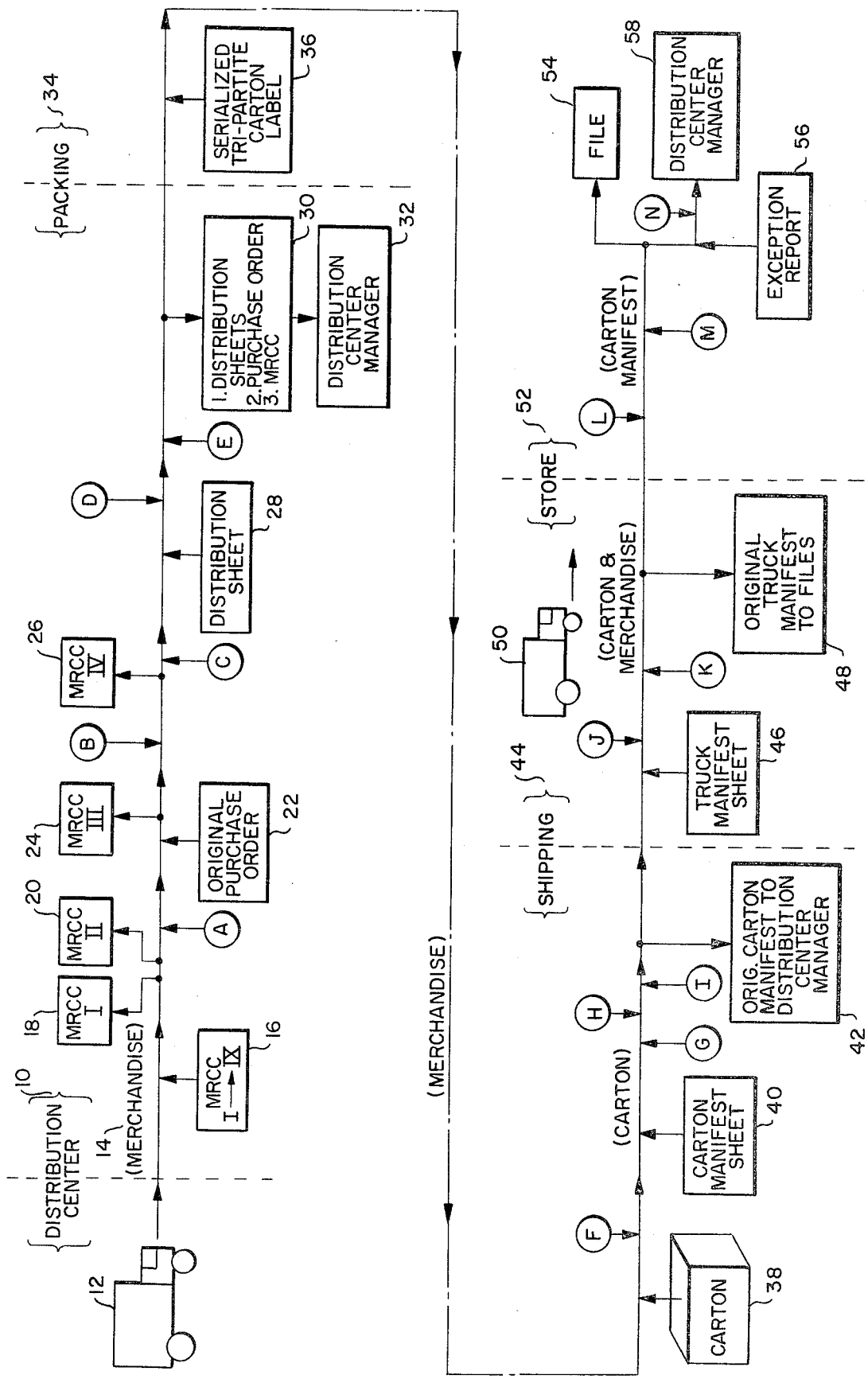
FIG. 1 is a chronological schematic diagram showing the flow of merchandise through the inventive system.

Referring now to FIG. 1, a typical flow of merchandise being distributed is shown in a stylized, chronological flow chart. The goods or merchandise, be it garments or television sets, are first transported to the distribution center 10 via a truck 12 or the like. Once the merchandise 14 is on hand, the merchandise receiving control card 16 comes into play. In the present embodiment, the merchandise receiving control card 16 comprises nine removable adhesive-backed labels, each being the identical serial number, which will be used to identify the merchandise through its distribution lifetime. Of course, any number of labels could be used, depending on the requirements of the individual system. These nine labels comprise the following: a freight bill stub, a receiving lot stub, a purchase order stub, an unpacking stub, a merchandise identification stub, a ticket making stub, an order-check stub, a payment control stub, and a completion stub. The freight bill stub 18 is immediately placed on the freight bill and the receiving log stub 20 is placed on the receiving log, thereby providing traceability of the incoming order and proof of receipt. As a means of keeping the merchandise receiving control card with the goods, the card itself may be attached to the fist carton of the receipt. This operation is shown at A. The purchase order 22, or computer generated listing sheet generated from the EDP input of the purchase order information, by which the merchandise was first ordered is retrieved and the purchase order stub 24 bearing the individual serial number is affixed thereto.

The carton of received merchandise is then opened and checked against the requested merchandise on the purchase order. This operation is shown at B. The unpacking stub 26 is then affixed to the appropriate document. The documents used to check in the merchandise may be a manual or computer generated purchase order, an invoice, or a computer generated listing sheet. The merchandise is then moved to the merchandise distributor where price ticketing may optionally occur. This operation is shown at C. It is to be noted that price tickets are an optional part of the inventive system and need not always be included.

At this point the distribution sheet 28, with peel off pressure-sensitive adhesive packing labels, may be computer generated as a single document for the entire distribution, or it may be a series of individual computer-generated store distributions with attached packing labels. The distribution sheet 28 could also be manually produced and pressure sensitive packing labels produced separately. The merchandise is then selected by location or customer, operation D, and the packing label portion of the distribution sheet 28 is placed in or on a suitable label carrier. This is shown at operation E. The distribution sheet, the purchase order, and the remainder of the merchandise receiving control card 30 are sent to the distribution center manager 32 and/or the accounts payable office. The merchandise is then moved to the packing location or station 34.

The serialized tripartite carton label 36 then is introduced into the system. A suitable carton 38 is obtained and the portion of the carton label bearing the truck manifest stub is affixed to the carton at F. The carton manifest sheet 40 is introduced into the system and the carton manifest header part of the carton label 36 is affixed to the carton manifest sheet 40. This operation is shown at G. It is noted that carton labels may be pre-printed or computer generated, and the carton label and carton manifest may be separate or combined forms. In this regard, attention is directed to FIG. 5, which shows such combined forms. The merchandise 14 is then placed in the carton 38 and the packing labels, which had been placed in or on the document carrier at E, are affixed to the carton manifest sheet 40 at H. This carton packing operation is repeated with other distribution merchandise until the carton is full. The carton manifest 40 is then copied, either xerographically or photographically at I, the copy of the carton manifest is placed into the carton 38, and the carton sealed. The original carton manifest bearing the labels of the merchandise placed in that particular carton is forwarded to the distribution center manager 42.

It is a specific feature of the present invention to utilize copies of various documents to prevent unauthorized pilferage and shrinkage. This is effective because it is much more difficult to alter a copy and, in any event, the original is always retained for ultimate comparison with the copy, altered or not. Alternatively, copies are not required when employing machine readable codes, such as OCRA, UPC, magnetic and dot code, that can be manually scanned or entered into automated page readers, since once the information is read in, it can not be altered.

The sealed carton 38 containing the merchandise is moved to the shipping area or loading dock 44, where the truck manifest sheet 46 enters the operation. The truck manifest stub is removed, indicated at J, from the address portion of the carton label 36, which had been applied to the carton at F. This operation continues until the truck is full or the shipment for that truck is completed. As each successive carton is loaded, the truck manifest stub is removed from the carton address label and affixed to the truck manifest sheet 46. The completed truck manifest 46 is then copied, the original is filed 48, and the copy goes with the shipment. Copies of the truck manifest may be attached to the bill of lading identifying each carton in the shipment or used independently if the shipment is in its own vehicle.

The shipment is then trucked 50 to the store 52 where the cartons are received. At the store 52, the carton number and address, as contained on the address portion of the carton label 36, is checked against the truck manifest 46 at L. Subsequently, the merchandise is checked in against the copy of the carton manifest 54 contained in the carton. This occurs at step M.

The carton manifest 40 may be prepared with a preprinted portion to be used in the event of a nonconformity. After performing the checking steps of L and M, if the shipment is correct, the merchandise enters the stock of the store and the carton manifest copy if filed 54. If there is a nonconformity present, then the exception report 56 at the bottom of the carton manifest sheet is completed at N and forwarded to the distribution center manager 58. The upper portion of the carton manifest is then also filed in the store's files 54.

Figure 2:
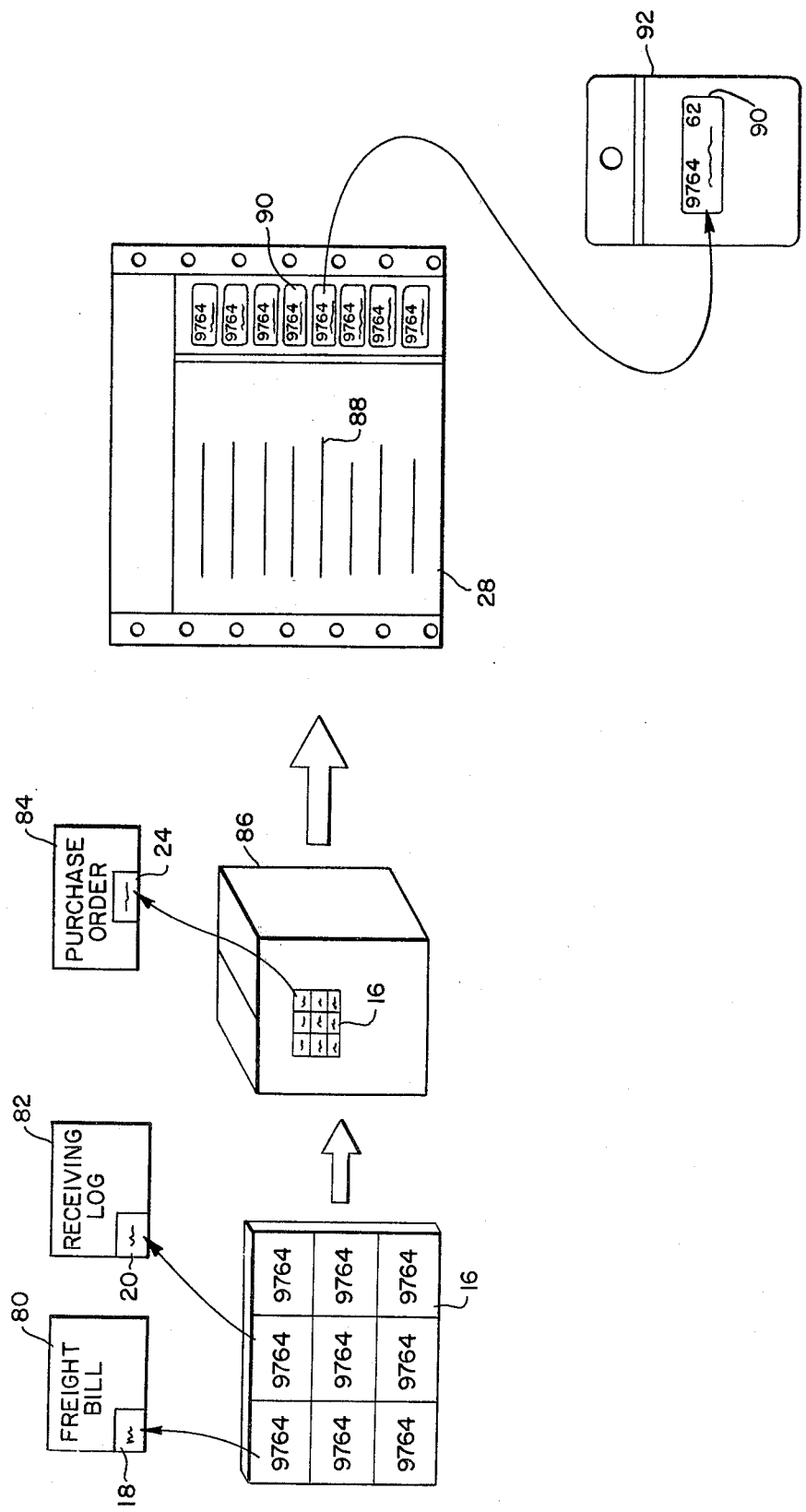
FIG. 2 is a pictorial diagram of certain elements of the inventive system shown in FIG. 1.

FIG. 2 shows certain elements of the inventive merchandise distribution control system in more detail and, in particular, shows the kind and format of two of the label sheets employed in the present invention. In FIG. 2, the merchandise receiving control card 16 consists of a sheet of nine pressure-sensitive adhesive-backed labels, which are removed from the sheet and which all bear the identical serial number. The function of each of these nine labels has been explained above. Specifically, the freight bill stub 18 is affixed to the freight bill 80, the receiving log stub 20 is affixed to the receiving log 82, and the purchase order stub 24 is affixed to the purchase order 84. The other labels are also affixed appropriately. As indicated above, it is desirable that the merchandise receiving control card 16 be affixed to the first carton 86 of the shipment as one of the first operations of the inventive system. An optional checking or listing sheet may be employed which may comprise a copy of the purchase order. This serves to check in the merchandise being distributed against that originally ordered.

At such time, the distribution sheet 28 is generated which lists all of the goods being distributed by store, color, size, and quantity on the seveal lines, shown typically at 88. The distribution sheet 28 also includes printed, removable, adhesive-backed, pressure-sensitive labels, shown typically at 90. It is advantageous to employ electronic data processing equipment to generate the information printed on the distribution sheet 28. As indicated above, the distribution sheet 28 can contain on the several lines 88 the code number for the store, the color of the garments, and the quantities of the various sizes. Each individual label 90 also has a store number, the style, the price, a serialized distribution number, the color, and the quantity. This individual label 90 may then be placed on a label carrier 92, which may comprise a plastic envelope for association with the specific goods being distributed.

Figure 3:
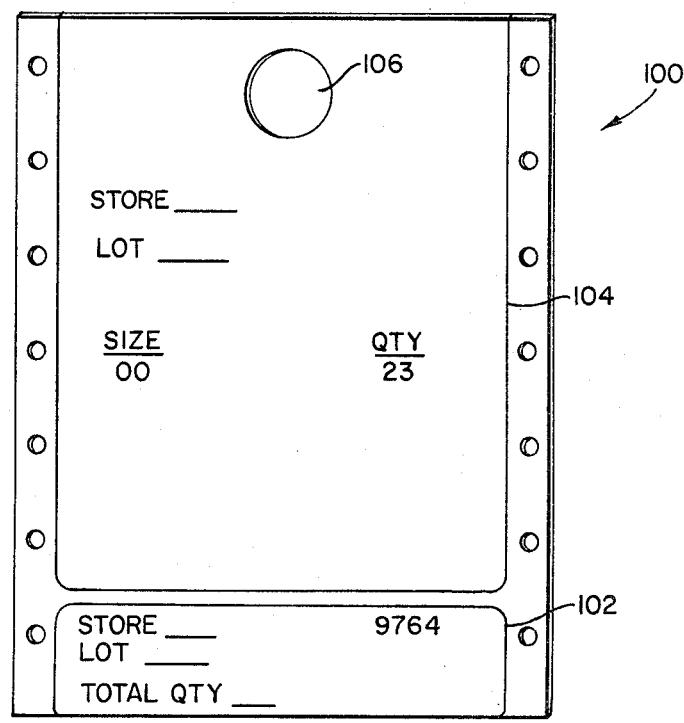
FIG. 3 is an alternate embodiment of the distribution sheet of the inventive system.

Alternatively, in place of the distribution sheet 28 shown in FIG. 2 with the detachable label 90 for use with the plastic label carrier 92, a specialized form of distribution sheet shown in FIG. 3 can be used. This sheet comprises a distribution transfer ticket 100, which is formed having a removable pressure sensitive adhesive label portion 102 corresponding substantially to the removable label 90 of distribution sheet 28. This ticket 100 also contains a printed portion 104, which has printed on it the same information as the removable part 102, i.e., the store number, the style, a serialized distribution number, the size, the color, and quantity of the specific items. A hole 106 is formed in this distribution ticket 100 so that in the case of garments normally placed on hangers, this ticket 100 may be slipped easily over the hook of the hanger. At this point then, the merchandise to be distributed has now been identified and tagged with suitable numbers which will remain with the merchandise through the distribution process. The sheet 100 can be produced automatically and, thus, sprocket holes 108 are shown for use with electronic data processing equipment. When the garment is placed in the carton, label portion 102 is removed and placed on the carton manifest sheet.

Figure 4:
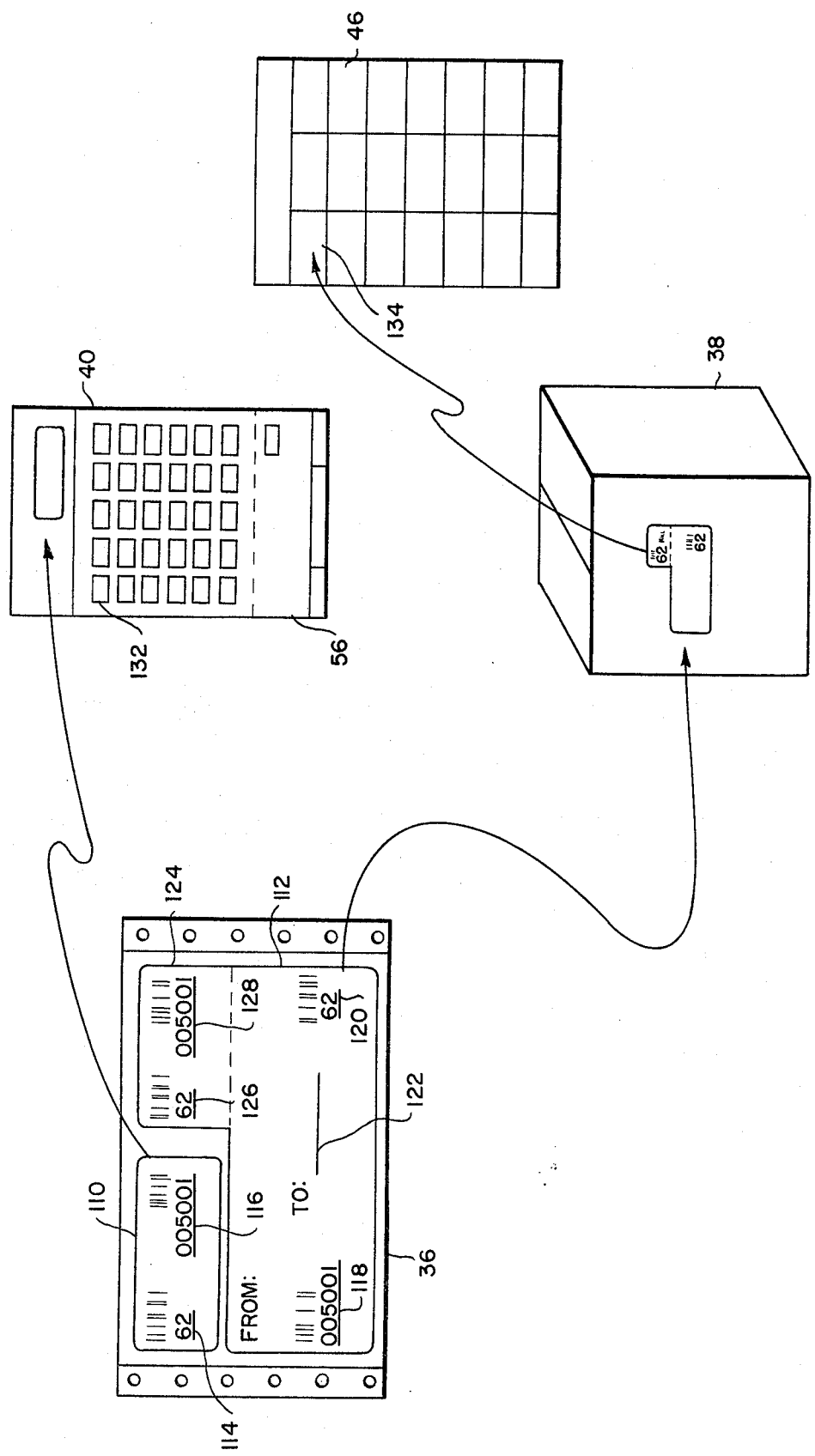
FIG. 4 is a pictorial diagram of certain other elements of the inventive system.

Referring now to FIG. 4, the carton label 36 is provided with a first removable pressure-sensitive label 110 and a second pressure-sensitive label 112. In regard to the first label 110, this comprises the carton manifest header and includes the store number thereon at 114 and the carton manifest number at 116. In regard to label 112, this portion comprises the carton address portion and includes the carton number at 118 and both the store number 120 and the store address 122. Label 112 is further provided with a detachable portion 124, which comprises the truck stub and also bears the store number 126 and the carton number 128. The purpose of this specialized truck stub portion 124 will be set forth hereinbelow.

The carton label 36 is utilized by removing the store address portion 112 from the label 36 and retaining the truck manifest 124, with its backing sheet, attached to the store address portion 112 and placing same on an actual carton. At the same time this portion 112 is placed on the carton 130, the other label 110 is placed on the carton manifest sheet 40 to act as the header. The carton manifest sheet 40 then has a numerical correspondence, by means of label 110, between the actual carton 38 and the carton manifest sheet 40. Then, as the garments, or other items of merchandise, are placed into the carton 38, the labels 90, which originated on the distribution sheet 28 and which were subsequently placed on the label carrier 92, are removed from the label carrier 92 and placed on the carton manifest sheet 40 at one of the several locations, shown typically at 132. Thus, as the carton 38 is filled, the carton manifest sheet 40 represents an entire listing of all of the items contained in the carton by means of labels 90.

When the carton 38 has been filled with the appropriate merchandise and is loaded on the truck, the upper portion 124 of the carton label 112 is removed and is placed on the truck manifest sheet 46 at the appropriate location, for example 134. As subsequent cartons are filled and loaded, the portion of their carbon label which corresponds to the portion 124 is removed and placed on the truck manifest sheet 46. Thus, when all of the cartons have been loaded onto the truck, the truck manifest will contain a list of not only the numbers corresponding to all of the cartons but also a listing of the various store numbers to which the cartons are to be delivered. By placing the label portions 124 on the truck manifest 46, in an orderly fashion, i.e., by placing all of the labels 124 corresponding to the same store in the same columns on the truck manifest 46, then it is a simple matter to see the list of all of the numbers of the cartons which must be delivered to each store. Alternatively, one could use a separate manifest sheet for each store, these could be retained in a loose leaf notebook form. Thereafter, each time a label is pulled it would be placed on the appropriate page. Therefore, it becomes an easy matter for the shipping personnel to determine both the contents of the truck and the ultimate destination thereof.

As a further aid to understanding the present invention, a typical example of distributing garments from a central distribution location to a number of stores will be explained in detail. The garments may originally be located at a manufacturer, wholesaler, or warehouse. The retailer then requests a variety of garments from the above source, typically, by means of a conventional purchase order. Then the cartons or garments on hangers, "GOH", are received at the designated location, i.e., at the distribution center. At that point, the merchandise receiving control card is assigned, which carries the same identification number on all labels located on that card. These labels may serve as proof of receipt on the receiving log entry, as authorization for freight payment, as merchandise identification numbers, as an authorization ticket, and as invoice payment authorization. These labels may be used on a request to return to the manufacturer, and may also serve to indicate a location identifier. Once the merchandise receiving control card has been assigned, i.e., once the same identification numbers have been assigned, the next operation is to check in what was received versus what was ordered. The receiving personnel may use a copy of the purchase order or they may use a computer generated listing sheet from the purchase order entry. Alternatively, a worksheet may be prepared, or the check in may simply be listed on the invoice.

At that point, the distribution sheet is created listing the garments to be distributed and having pressure-sensitive adhesive-backed distribution labels for peeling off the sheet. As indicated, it is preferable that this distribution list be printed by electronic data processing equipment, thereby retaining in the EDP equipment the information required initially to prepare the list.

The distribution label is then removed from the distribution list and placed with or on the first garment, either onto the label carrier, or in the event that a hang tag distribution label is used, when the label is its own carrier. The next operation is to place the garments into the various store cartons. At that time, the carton label is selected, which contains the carton address label, the manifest header, and the truck manifest stub. These are then placed at the appropriate locations, i.e., the carton label with the truck manifest stub is attached to the carton, and the carton manifest header is attached to the carton manifest sheet. It is understood that this operation takes place at the time the garments are placed in the appropriate store cartons. When hanging garments are shipped to a store, the labels are still applied to a manifest sheet, and the carton label can be assigned even though there is no carton. In other words, the lot can be identified by the carton label, in the absence of a carton.

The distribution labels or packing stubs are attached to the carton manifest sheet, when the carton is full the shipping personnel makes a copy of the carton manifest and places the copy in the carton for the store manager. The original is retained in the distribution center. As pointed out, by using a xerographic or photographic copy, it is very difficult to alter the paper in the carton in the event that garments are removed from the carton. The carton is then physically transported to the shipping dock and the truck manifest comes into the flow of the system. The truck manifest stub is removed from the carton at the time the carton is loaded onto the truck and is placed on the truck shipping manifest. As pointed out, by placing all the truck manifest stubs relating to the same store in the same column, it is an easy matter to determine the number of cartons destined for a specific store. Once again the truck manifest is copied by xerographic or photographic means and retained at the distribution center.

The shipment is then trucked to the destination store, where receipt of the shipment can be acknowledged by a copy of the truck manifest sheet, which can even be mailed in advance to the store. At the destination the cartons are opened and the receiving agent checks the carton manifest by serial number and contents.

It is pointed out that the carton manifest sheet may employ an "exception portion" for use when there are nonconformities in the shipment as received. Thus, when the carton is opened and the contents examined if there is an error, the receiving personnel completes the "exception portion" of the carton manifest sheet and returns it to the origination point. Subsequently, the carton manifest sheet is filed by carton serial number. At this point, it is then possible to audit the carton serial numbers and the merchandise receiving control card numbers to correlate the same and to detect any missing cartons or merchandise. It is also possible at the receiving destination to electronically key in the carton serial numbers for automated or EDP input back to the home office or distribution center.

Figure 5:
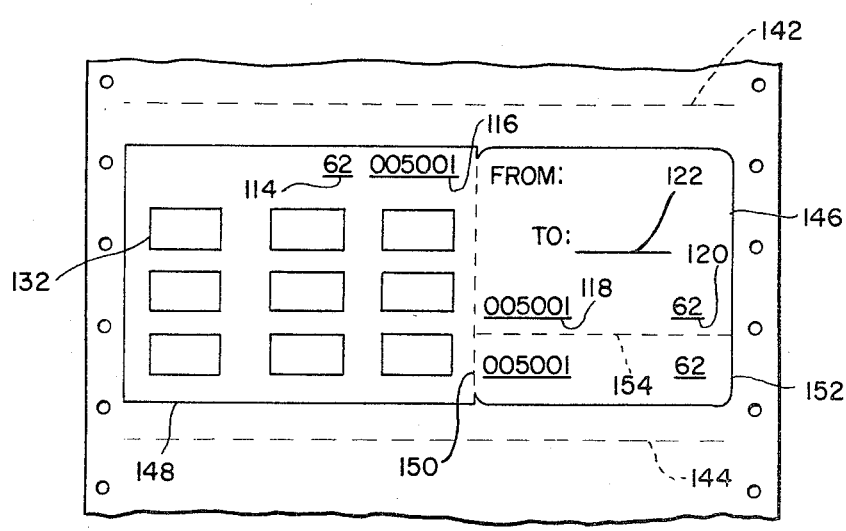
FIG. 5 is carton label formed with a carton manifest sheet.

Referring to FIG. 5, which is a combined address label and carton manifest sheet, the sprocket holes, shown typically at 140 indicate that this label may be automatically printed. The entire combination is perforated at 142 and 144, so that it may be separated from the continuous roll if desired. The address label portion 146 is provided with a pressure-sensitive adhesive backing and is attached to the carton manifest sheet 148 at a perforated line 150. The address label portion 146 is also provided with a detachable truck manifest stub 152. In use, the combined address label and carton manifest sheet is removed and the adhesive on the address label used to adhere the combination to the carton. As items are placed in the carton, packing stubs are affixed to the carton manifest sheet 148. When the carton is full or the shipment completed, the carton manifest 148 is separated from the address label 146 along perforated line 150. When the carton is ready for loading on a truck the truck manifest stub 152 is separated from the address label 146 along perforated line 154.

It is understood, of course, that the foregoing is presented by way of example only and is not intended to limit the scope of the present invention, except as set forth in the appended claims.

What is claimed is:

1. A method for controlling the distribution of a plurality of items of merchandise to selected locations comprising the steps of:
   listing the identification data for groups of items of merchandise intended for distribution to the selected locations, including listing a location identification number and a distribution list serial number;
   providing a packing stub label for each selected group of items including printing all of the identification data the distribution list serial number, and the location identification number on each label;
   associating a packing stub label with a corresponding selected group of items;
   providing an address label having the selected location address, the location identification number, and the distribution list serial number and including a separable segment bearing the location identification number and the distribution list serial number;

placing a container manifest label bearing the location identification number and the distribution list serial number on a container manifest;

containerizing each group of items;

placing the packing stub for each containerized group of items on the container manifest;

affixing the address label to the container;

placing the containers on a conveyance;

separating the segment from the address label and affixing it to a conveyance manifest;

conveying the containers to the selected location; and checking the items in the container against the packing stubs on the container manifest.

2. The method of claim 1, including the step of providing a merchandise receiving control card being formed as a plurality of removable control labels all bearing the distribution list serial number.

3. The method of claim 2, including the further step of affixing a selected one of the control labels to a freight bill previously associated with certain ones of the plurality of items of merchandise.

4. The method of claim 3, including the step of affixing a selected one of the control labels to a receiving log.

5. The method of claim 1, including the steps of making a copy of the container manifest after the packing stubs have been placed thereon and filing the original of the container manifest.

6. The method of claim 1, including the steps of making a copy of the conveyance manifest after the separable segments have been affixed thereto, placing the copy in the container, and filing the original.

7. A method for controlling the distribution of items of merchandise to selected destinations comprising the steps of:

creating a distribution list setting forth all items of merchandise to be distributed;

providing the distribution list with a plurality of separable distribution labels, each label corresponding to a selected destination and quantity of merchandise;

associating a distribution label with its corresponding item of merchandise;

providing a carton label having a plurality of separable portions each having the same destination code and serial number;

affixing two of the plurality of detachable portions of the carton label to a carton into which the items of merchandise are to be placed;

affixing another portion of the plurality of detachable portions of the carton label to a carton manifest sheet;

affixing a distribution label to the carton manifest when its associated item of merchandise is placed in the carton;

separating one of the two portions of the carton label affixed to the carton and placing it on a truck manifest sheet;

placing the cartons on a transport means for transporting the cartons to a destination; and upon receipt at the destination, checking that the cartons on the transport means correspond to the segments of the carton label portions affixed to the truck manifest sheet and that the goods in the cartons correspond to the distribution labels affixed to the carton manifest sheet.

8. The method of claim 7, wherein the step of providing the distribution list includes the step of providing distribution labels in the form of labels which may be associated with hanger means bearing the merchandise.

9. The method of claim 7, wherein the step of providing a carton label includes the steps of providing a three-part label, each label part bearing the same serial number and consisting of a carton address label, a carton manifest header, and a truck manifest stub.

10. The method of claim 9, wherein the step of providing a three-part carton label includes the further steps of providing the carton address label and the truck manifest stub attached to each other as a single unitary element and perforating the single unitary element so that the carbon address label and the stub may be separated.

11. The method of claim 7, including the further steps, following the steps of affixing a portion of the carton label to the carton manifest sheet and affixing the distribution labels to the carton manifest when the items of merchandise are placed in carton, of making a xerographic copy of the carton manifest sheet, placing the copy in the carton, and retaining the original.

12. The method of claim 7, including the further steps, after having placed all of the portions of the carton labels on the truck manifest, of making a xerographic copy of the truck manifest, forwarding the copy with the transport means, and retaining the original.

13. Merchandise distribution control apparatus, comprising:

a distribution sheet having printed thereon a listing of all of the merchandise to be distributed and including a plurality of removable adhesive distribution labels bearing an identification of the destination of selected quantities of the merchandise for association with the selected quantities of merchandise;

a carton label formed having two detachable portions one said portion being formed into two separable segments for attaching to a carton;

a carton manifest sheet having spaces thereon for accepting said distribution labels and the other of said two portions of said carton label; and a truck manifest sheet having spaces thereon for accepting a plurality of ones of said separable segments of said one portion of said carton labels, whereby said distribution labels are first associated with the merchandise, one portion of the carton label is applied to the carton, the distribution labels are placed on the carton manifest, and a segment of the portion of the carton label of every carton loaded on a truck is affixed to the truck manifest.

14. The apparatus of claim 13, wherein said plurality of removable adhesive distribution labels are formed having an opening for placing on a garment hanger.

15. The apparatus of claim 13, wherein the two portions of said carton label including the each has an identical serial number and further comprise a carton address label, a carton manifest header and a truck manifest stub.

16. The apparatus of claim 13, wherein said carton manifest sheet further includes an exception report portion having blanks thereon to receive information and being arranged to be separable from said carbon manifest sheet.

17. The apparatus of claim 13, further including a label carrier for attaching to the merchandise and being arranged to receive the distribution label from the distribution list.

* * * * *